United States Patent
Zhang et al.

(10) Patent No.: US 12,410,066 B2
(45) Date of Patent: Sep. 9, 2025

(54) TWO-DIMENSIONAL HIGH-ENTROPY METAL OXIDE ASSEMBLY WITH HIGH THERMAL CONDUCTIVITY AND PREPARATION METHOD THEREOF

(71) Applicant: Zhejiang University, Zhejiang (CN)

(72) Inventors: Lingjie Zhang, Zhejiang (CN); Weiwei Cai, Zhejiang (CN); Ningzhong Bao, Zhejiang (CN)

(73) Assignee: Zhejiang University, Hangzhou (CN)

( * ) Notice: Subject to any disclaimer, the term of this patent is extended or adjusted under 35 U.S.C. 154(b) by 722 days.

(21) Appl. No.: 17/667,559

(22) Filed: Feb. 9, 2022

(65) Prior Publication Data

US 2022/0242745 A1 Aug. 4, 2022

Related U.S. Application Data

(63) Continuation of application No. PCT/CN2021/087663, filed on Apr. 16, 2021.

(30) Foreign Application Priority Data

Feb. 1, 2021 (CN) .......................... 202110133141.0

(51) Int. Cl.
*C01G 51/70* (2025.01)

(52) U.S. Cl.
CPC .......... *C01G 51/70* (2013.01); *C01P 2002/52* (2013.01); *C01P 2004/10* (2013.01); *C01P 2006/32* (2013.01)

(58) Field of Classification Search
CPC .. C01G 51/70; C01P 2002/52; C01P 2004/10; C01P 2006/32
See application file for complete search history.

(56) References Cited

FOREIGN PATENT DOCUMENTS

| CN | 105714353 A | * | 6/2016 | |
| CN | 108745369 A | * | 11/2018 | |
| WO | WO-2019159857 A1 | * | 8/2019 | .............. C01F 11/02 |

OTHER PUBLICATIONS

Krawczyk et al. ACS Appl. Electron. Mater. 2020, 2, 3211-322 (Year: 2020).*
Kajita et al. WO2019159857A1 English Machine Translation (Year: 2019).*
Lu et al. CN105714353A English Machine Translation (Year: 2018).*
Ma et al. CN108745369A English Machine Translation (Year: 2018).*
Prado-Gonjal et al. Mat. Res. Bull. 2011, 46, 222-230 (Year: 2011).*
Wang et al. ACS Appl. Mater. Interfaces 2017, 9, 21756-21762 (Year: 2017).*
Pawel A. Krawczyk et al., High-Entropy Perovskites as Multifunctional Metal Oxide Semiconductors: Synthesis and Characterization of (Gd0.2Nd0.2La0.2Sm0.2Y0.2) CoO3, ACS Applied Electronic Materials, Sep. 18, 2020, pp. 3211-3220, vol. 2.

* cited by examiner

*Primary Examiner* — Sally A Merkling
*Assistant Examiner* — Jordan W Taylor

(57) ABSTRACT

The present disclosure relates to the field of new materials, and aims at providing a two-dimensional high-entropy metal oxide assembly with high thermal conductivity and a preparation method thereof. The two-dimensional high-entropy metal oxide assembly with the high thermal conductivity has a molecular formula of $(Co_{0.3}La_{0.6}Er_{0.6}Y_{0.7}Mn_{0.4}Ga_{0.4})O_4$. The two-dimensional high-entropy metal oxide assembly with the high thermal conductivity is in a short fiber shape with a length-diameter ratio of the short fiber of 5 to 7 and has a cross section of a regular triangle with the side length of the regular triangle of 100 to 300 nm. The present disclosure achieves one-dimensional high thermal conductivity of metal oxide assembly by means of orderly assembling of high-entropy oxide in the direction perpendicular to nanosheets. Meanwhile, the assembly enables uniform distribution of heterogeneous elements in the two-dimensional plane during the preparation process.

4 Claims, No Drawings

TWO-DIMENSIONAL HIGH-ENTROPY METAL OXIDE ASSEMBLY WITH HIGH THERMAL CONDUCTIVITY AND PREPARATION METHOD THEREOF

CROSS-REFERENCE TO RELATED APPLICATION

The present application is a Continuation application of PCT Application No. PCT/CN2021/087663 filed on Apr. 16, 2021, which claims the benefit of Chinese Patent Application No. 202110133141.0 filed on Feb. 1, 2021. The contents of the above are hereby incorporated by reference in their entirety.

FIELD OF THE INVENTION

The present disclosure relates to the field of new materials, in particular to a two-dimensional high-entropy metal oxide assembly $(Co_{0.3}La_{0.6}Er_{0.6}Y_{0.7}Mn_{0.4}Ga_{0.4})O_4$ with high thermal conductivity and a preparation method thereof.

BACKGROUND OF THE INVENTION

High-entropy materials have attracted extensive attention because of their unique structural features and adjustability achieved by adjusting the types of heterogeneous elements. Although the high-entropy materials have a series of extremely excellent properties, including high structural stability, high hardness, high-temperature creep resistance, high chemical stability, etc., their thermal conductivity is often poor. Due to existence of the large number of heterogeneous elements and structural distortions in high-entropy materials, phonon scattering is more serious, resulting in low thermal conductivity of the high-entropy materials.

SUMMARY OF THE INVENTION

In order to solve the technical problem, the solutions of the present disclosure are to:

provide a two-dimensional high-entropy metal oxide assembly with high thermal conductivity. The metal oxide assembly a molecular formula of $(Co_{0.3}La_{0.6}Er_{0.6}Y_{0.7}Mn_{0.4}Ga_{0.4})O_4$. The metal oxide assembly is in a short fiber shape with a length-diameter ratio of the short fiber of 5 to 7 and has a cross section of a regular triangle with a side length of the regular triangle of 100 to 300 nm (the length range of the short fiber can be calculated by knowing the side length of the triangle and the length-diameter ratio of the short fiber).

The present disclosure further provides a preparation method of the two-dimensional high-entropy metal oxide assembly with high thermal conductivity, including the following steps:

(1) taking $Co(NO_3)_2$, $La(NO_3)_3$, $Er(NO_3)_3$, $Y(NO_3)_3$, $MnCl_2$ and $GaCl_3$ as solutes at a molar ratio of 0.3:0.6:0.6:0.7:0.4:0.4, taking methanol, anhydrous ethanol, isopropanol and n-butanol at a molar ratio of 0.3:3:0.5:0.1 to uniformly mix them into a solvent, adding the solutes to the solvent with a ratio of a total mass of the solutes to a mass of the solvent being 17.6%, and stirring the mixture for 20 to 40 min to obtain a first mixed liquid for standby application;

(2) taking p-phenol, 1,3-cyclohexanedione, furoin and inositol as solutes at a molar ratio of 0.1 to 0.3:0.7 to 0.9:2.5 to 3.5:0.012 to 0.014 and adding them to n-propanol with a ratio of a total mass of the solutes to a mass of the n-propanol being 6.5%, and stirring the mixture for 3 to 5 h to obtain a second mixed liquid for standby application;

(3) taking the first mixed liquid and the second mixed liquid at a molar ratio of 3 to 5:11 to 13, cooling them to 0° C., mixing them in an environment where ultraviolet light is completely shielded and continuously stirring the mixture for 5 to 15 min, and keeping the mixture still standing at 0° C. for 10 to 12 h in an environment where ultraviolet light is completely shielded to obtain a third mixed liquid;

(4) pouring the third mixed liquid into a culture dish until a height of a liquid level is 10 mm, heating the third mixed liquid to 20° C., and irradiating the third mixed liquid with the ultraviolet light having a wavelength of 100 nm to 300 nm for 3 to 5 h to obtain a fourth mixed liquid;

(5) placing the fourth mixed liquid into a sealed container, performing alternating pulse on the solution with a magnetic force and microwaves to obtain a fifth mixed liquid; and (6) freezing and drying the fifth mixed liquid, washing the frozen and dried fifth mixed liquid with deionized water and acetone 7 times separately, and drying the fifth mixed liquid to obtain the two-dimensional high-entropy metal oxide assembly with the high thermal conductivity.

In step (4) in the present disclosure, the wavelength of the ultraviolet light is 100 nm to 300 nm.

In step (5) in the present disclosure, a time interval of magnetic pulse and microwave pulse is 1 min, the magnetic field pulse lasts for 2 to 4 s, and the microwave pulse lasts for 7 to 9 s; and the magnetic pulse is performed 5 times in total, the microwave pulse is performed 5 times in total, magnetic field intensity is 0.75 to 0.85 Tesla (T), and a microwave power is 700 W to 900 W.

DESCRIPTION ON THE PRINCIPLE OF THE INVENTION

In the present disclosure, the high entropy is a scientific definition, which generally refers to a compound with more than four or five types of elements at the same chemical structure site. High-entropy materials have better structural stability. In the meantime, the materials can have better designability due to various heterogeneous elements and structural distortions brought by the high entropy, and the desired material properties can be obtained by adjusting the types of elements.

In the present disclosure, homogenization of heterogeneous elements and formation of nanosheets induced triangularly by ultraviolet light are used. In the step (4) of a preparation method, a hole electron pair is formed by performing excitation by an ultraviolet light irradiation under the condition of controlling a low-temperature of 0° C. In the meantime, the hole electron pair is finitely separated to form a dipole moment. The dipole moments interact with each other to form triangular nanosheets. In the meantime, the obtained triangular nanosheets have magnetic moments perpendicular to the sheet layers by synergistic effects produced by introducing cobalt to cooperate with other elements (a magnetic moment induction of Ga to Co and a super-exchange interaction for Mn), so that the short fibers can be directionally and regularly assembled under magnetic field induction, wherein longitudinal directions of the short fibers are perpendicular to the nanosheets. Furthermore, the sheet layers of the nanosheet assembly are further chemically bonded via a short-time microwave pulse. Moreover, the sheet layers still maintain orderly structures during bonding due to the short time of pulse, so that the high-entropy oxide short fibers have high thermal conductivity in the length direction of the fibers.

Compared with the prior art, the present disclosure has the following beneficial effects.

1. The present disclosure achieves preparation of high-entropy oxides with high thermal conductivity by providing a combination process (homogenization of heterogeneous elements and formation of nano sheets induced triangularly by ultraviolet light, and assembling of nanosheets induced by magnetic field pulse in combination with microwave pulse to bond) that strictly controls parameters.
2. The present disclosure achieves one-dimensional high thermal conductivity of the metal oxide assembly by means of orderly assembling of high-entropy oxides in the direction perpendicular to nanosheets. Meanwhile, the assembly enables uniform distribution of heterogeneous elements in the two-dimensional plane during the preparation process and has a better thermal conductivity compared with an existing high-entropy oxide.

DETAILED DESCRIPTION

The present invention is described below in details in conjunction with the particular embodiments. The following embodiments facilitate those skilled in the art further understanding the present disclosure, but do not limit the present disclosure in any way. It should be noted that, for those skilled in the art, several alterations and modifications can be made without departing from the concept of the present invention, which fall within the protection scope of the present invention.

Example 1

The preparation method of a two-dimensional high-entropy metal oxide assembly $(Co_{0.3}La_{0.6}Er_{0.6}Y_{0.7}Mn_{0.4}Ga_{0.4})O_4$ with high thermal conductivity includes the following steps.

(1) $Co(NO_3)_2$, $La(NO_3)_3$, $Er(NO_3)_3$, $Y(NO_3)_3$, $MnCl_2$ and $GaCl_3$ were taken at a molar ratio of 0.3:0.6:0.6:0.7:0.4:0.4 and added to a mixed solution of methanol/anhydrous ethanol/isopropanol/n-butanol with a mass ratio of 0.3:3:0.5:0.1, and the mixture was stirred for 20 min, to obtain a first mixed liquid. A ratio of a total mass of $Co(NO_3)_2$, $La(NO_3)_3$, $Er(NO_3)_3$, $Y(NO_3)_3$, $MnCl_2$ and $GaCl_3$ to a mass of the mixed solution of methanol/anhydrous ethanol/isopropanol/n-butanol with the mas ratio of 0.3:3:0.5:0.1 was 17.6%.

(2) P-phenol, 1,3-cyclohexanedione, furoin and inositol were taken at a molar ratio of 0.1:0.7:2.5:0.012 and added to n-propanol, and the mixture was stirred for 3 h, to obtain a second mixed liquid. A ratio of a total mass of p-phenol, 1,3-cyclohexanedione, furoin and inositol to a mass of n-propanol was 6.5%.

(3) The first mixed liquid obtained in step (1) and the second mixed liquid obtained in step (2) were simultaneously cooled to 0° C., and mixed and stirred for 5 min in an environment where ultraviolet light was completely shielded. The mixture was subjected to still standing for 10 h in an environment where ultraviolet light is completely shielded at 0° C. to obtain a third mixed liquid. A mass ratio of the first mixed liquid to the second mixed liquid was 3:11.

(4) The third mixed liquid obtained in step (3) was poured into a culture dish until a height of a liquid level was 10 mm, and heated to 20° C., and the third mixed liquid was irradiated with the ultraviolet light having a wavelength of 100 nm for 3 h to obtain a fourth mixed liquid.

(5) The fourth mixed liquid obtained in step (4) was placed into a sealed container, and subjected to alternating pulse with a magnetic force and microwaves to obtain a fifth mixed liquid. The magnetic field pulse lasted for 2 s, and the microwave pulse lasted for 7 s, a time interval of magnetic pulse and microwave pulse was 1 min. The magnetic pulse was performed 5 times in total, and the microwave pulse was performed 5 times in total, magnetic field intensity was 0.75 Tesla (T), and a microwave power was 700 W.

(6) The fifth mixed liquid obtained in step (5) was frozen and dried, and the frozen and dried fifth mixed liquid was washed with deionized water and acetone 7 times separately and dried, to obtain the two-dimensional high-entropy metal oxide assembly $(Co_{0.3}La_{0.6}Er_{0.6}Y_{0.7}Mn_{0.4}Ga_{0.4})O_4$ with the high thermal conductivity.

The obtained assembly was in a short fiber shape, had a length-diameter ratio of 5 and a cross section of a regular triangle with a side length of the regular triangle of 100 nm.

The obtained product was mixed with epoxy resin at a volume ratio of 1:5 and cured, and cut into sheet-like samples having diameters of 12.8 mm and thickness of 1 mm. The thermal conductivity of the product was measured using a laser thermal conductivity tester at a temperature of 100° C.

As tested, the thermal conductivity of the product was 1890 W/m*K. The thermal conductivity of the epoxy resin was 1 W/m*K. The application of the product of the Example to the epoxy resin by mixing enables an increase by 1200 times in the thermal conductivity of the epoxy resin.

Example 2

A preparation method of a two-dimensional high-entropy metal oxide assembly $(Co_{0.3}La_{0.6}Er_{0.6}Y_{0.7}Mn_{0.4}Ga_{0.4})O_4$ with high thermal conductivity includes the following steps.

(1) $Co(NO_3)_2$, $La(NO_3)_3$, $Er(NO_3)_3$, $Y(NO_3)_3$, $MnCl_2$ and $GaCl_3$ were taken at a molar ratio of 0.3:0.6:0.6:0.7:0.4:0.4 and added to a mixed solution of methanol/anhydrous ethanol/isopropanol/n-butanol with a mass ratio of 0.3:3:0.5:0.1, and the mixture was stirred for 40 min, to obtain a first mixed liquid. A ratio of a total mass of $Co(NO_3)_2$, $La(NO_3)_3$, $Er(NO_3)_3$, $Y(NO_3)_3$, $MnCl_2$ and $GaCl_3$ to a mass of the mixed solution of methanol/anhydrous ethanol/isopropanol/n-butanol with the mas ratio of 0.3:3:0.5:0.1 was 17.6%.

(2) P-phenol, 1,3-cyclohexanedione, furoin and inositol were taken at a molar ratio of 0.3:0.9:3.5:0.014 and added to n-propanol, and the mixture was stirred for 5 h, to obtain a second mixed liquid. A ratio of a total mass of p-phenol, 1,3-cyclohexanedione, furoin and inositol to a mass of n-propanol was 6.5%.

(3) The first mixed liquid obtained in step (1) and the second mixed liquid obtained in step (2) were simultaneously cooled to 0° C. and mixed and stirred for 15 min in an environment where ultraviolet light was completely shielded, the mixture was subjected to still standing for 12 h in an environment where ultraviolet light is completely shielded at 0° C. to obtain a third mixed liquid. A mass ratio of the first mixed liquid to the second mixed liquid was 5:13.

(4) The third mixed liquid obtained in step (3) was poured into a culture dish until a height of a liquid level was 10 mm, and heated to 20° C., and the third mixed liquid was irradiated with the ultraviolet light having a wavelength of 300 nm for 5 h, to obtain a fourth mixed liquid.

(5) The fourth mixed liquid obtained in step (4) was placed into a sealed container, and subjected to alternating pulse with a magnetic force and microwaves, to obtain a fifth mixed liquid. The magnetic field pulse lasted for 4 s, and the microwave pulse lasted for 9 s, a time interval of magnetic pulse and microwave pulse was 1 min. The magnetic pulse was performed 5 times in total, the microwave pulse was performed 5 times in total, magnetic field intensity was 0.85 Tesla (T), and a microwave power was 900 W.

(6) The fifth mixed liquid obtained in step (5) was frozen and dried, and the frozen and dried fifth mixed liquid was washed with deionized water and acetone 7 times separately and dried, to obtain the two-dimensional high-entropy metal oxide assembly $(Co_{0.3}La_{0.6}Er_{0.6}Y_{0.7}Mn_{0.4}Ga_{0.4})O_4$ with the high thermal conductivity.

The obtained assembly was in a short fiber shape, had a length-diameter ratio of 7, and had a cross section of a regular triangle with the side length of the regular triangle of 300 nm.

The obtained product was mixed with epoxy resin at a volume ratio of 1:5 and cured, and cut into sheet-like samples having diameters of 12.8 mm and thickness of 1 mm. The thermal conductivity of the product was measured using a laser thermal conductivity tester at a temperature of 100° C.

As tested, the thermal conductivity of the product was 1670 W/m*K. The thermal conductivity of the epoxy resin was 1 W/m*K. The application of the product of the Example to the epoxy resin by mixing enables an increase by 820 times in the thermal conductivity of the epoxy resin.

Example 3

A preparation method of a two-dimensional high-entropy metal oxide assembly $(Co_{0.3}La_{0.6}Er_{0.6}Y_{0.7}Mn_{0.4}Ga_{0.4})O_4$ with high thermal conductivity includes the following steps.

(1) $Co(NO_3)_2$, $La(NO_3)_3$, $Er(NO_3)_3$, $Y(NO_3)_3$, $MnCl_2$ and $GaCl_3$ were taken at a molar ratio of 0.3:0.6:0.6:0.7:0.4:0.4 and added to a mixed solution of methanol/anhydrous ethanol/isopropanol/n-butanol with a mass ratio of 0.3:3:0.5:0.1, and the mixture was stirred for 30 min, to obtain a first mixed liquid. A ratio of a total mass of $Co(NO_3)_2$, $La(NO_3)_3$, $Er(NO_3)_3$, $Y(NO_3)_3$, $MnCl_2$ and $GaCl_3$ to a mass of the mixed solution of methanol/anhydrous ethanol/isopropanol/n-butanol with the mas ratio of 0.3:3:0.5:0.1 was 17.6%.

(2) P-phenol, 1,3-cyclohexanedione, furoin and inositol were taken at a molar ratio of 0.2:0.8:3.0:0.013 and added to n-propanol, and the mixture was stirred for 4 h, to obtain a second mixed liquid. A ratio of a total mass of p-phenol, 1,3-cyclohexanedione, furoin and inositol to a mass of n-propanol was 6.5%.

(3) The first mixed liquid obtained in step (1) and the second mixed liquid obtained in step (2) were simultaneously cooled to 0° C. and mixed and stirred for 10 min in an environment where ultraviolet light was completely shielded, the mixture was subjected to still standing for 11 h in an environment where ultraviolet light is completely shielded at 0° C., to obtain a third mixed liquid. A mass ratio of the first mixed liquid to the second mixed liquid was 4:12.

(4) The third mixed liquid obtained in step (3) was poured into a culture dish until a height of a liquid level was 10 mm, and heated to 20° C., and the third mixed liquid was irradiated with the ultraviolet light having a wavelength of 200 nm for 4 h, to obtain a fourth mixed liquid.

(5) The fourth mixed liquid obtained in step (4) was placed into a sealed container, and subjected to alternating pulse with a magnetic force and microwaves, to obtain a fifth mixed liquid. The magnetic field pulse lasted for 3 s, and the microwave pulse lasted for 8 s, a time interval of magnetic pulse and microwave pulse was 1 min. The magnetic pulse was performed 5 times in total, the microwave pulse was performed 5 times in total, magnetic field intensity was 0.80 Tesla (T), and a microwave power was 800 W.

(6) The fifth mixed liquid obtained in step (5) was frozen and dried, and the frozen and dried fifth mixed liquid was washed with deionized water and acetone 7 times separately and dried, to obtain the two-dimensional high-entropy metal oxide assembly with the high thermal conductivity $(Co_{0.3}La_{0.6}Er_{0.6}Y_{0.7}Mn_{0.4}Ga_{0.4})O_4$.

The obtained assembly was in a short fiber shape, had a length-diameter ratio of 6, and had a cross section of a regular triangle with the side length of the regular triangle of 200 nm.

The obtained product was mixed with epoxy resin at a volume ratio of 1:5 and cured, and cut into sheet-like samples having diameters of 12.8 mm and thickness of 1 mm. The thermal conductivity of the product was measured using a laser thermal conductivity tester at a temperature of 100° C.

As tested, the thermal conductivity of the product was 1710 W/m*K. The thermal conductivity of the epoxy resin was 1 W/m*K. The application of the product of the Example to the epoxy resin by mixing enables an increase by 910 times in the thermal conductivity of the epoxy resin.

Comparative Example 1

A commercially available high-entropy oxide powder $(MnNiFeCrCo)_3O_4$ was measured for the thermal conductivity according to the method the same as the above.

As tested the thermal conductivity of the commercially available high-entropy oxide powder $(MnNiFeCrCo)_3O_4$ was 210 W/m*K. The thermal conductivity of the epoxy resin was 1 W/m*K.

The application of the commercially available high-entropy oxide powder product $(MnNiFeCrCo)_3O_4$ by mixing enable an increase by 12 times in the thermal conductivity of the epoxy resin.

The particular examples in the present disclosure are described above. It should be understood that the present invention is not limited to specific embodiments described above, and various alterations or modifications may be made by those skilled in the art within the scope of the claims, not affecting essential contents in the present disclosure.

The invention claimed is:

1. A two-dimensional high-entropy metal oxide assembly with high thermal conductivity, wherein the metal oxide assembly has a molecular formula of (Co0.3La0.6Er0.6Y0.7Mn0.4Ga0.4)O, is in a short fiber shape with a length-diameter ratio of the short fiber of 5 to 7, and has a cross section of a regular triangle with a side length of the regular triangle of 100 to 300 nm.

2. A method to prepare the two-dimensional high-entropy metal oxide assembly with high thermal conductivity according to claim 1, comprising the following steps:
   (1) taking $Co(NO_3)_2$, $La(NO_3)_3$, $Er(NO_3)_3$, $Y(NO_3)_3$, $MnCl_2$ and $GaCl_3$ as solutes at a molar ratio of 0.3:0.6:0.6:0.7:0.4:0.4, taking methanol, anhydrous ethanol, isopropanol and n-butanol at a molar ratio of 0.3:3:0.5:0.1 to uniformly mix them into a solvent, adding the solutes to the solvent with a ratio of a total mass of the solutes to a mass of the solvent being 17.6%, and stirring the mixture for 20 to 40 min to obtain a first mixed liquid for standby application;
   (2) taking p-phenol, 1,3-cyclohexanedione, furoin and inositol as solutes at a molar ratio of 0.1 to 0.3:0.7 to 0.9:2.5 to 3.5:0.012 to 0.014 and adding them to n-propanol with a ratio of a total mass of the solutes to a mass of the n-propanol being 6.5%, and stirring the mixture for 3 to 5 h to obtain a second mixed liquid for standby application;
   (3) taking the first mixed liquid and the second mixed liquid at a molar ratio of 3 to 5:11 to 13, cooling them to 0° C., mixing them in an environment where ultraviolet light is completely shielded, continuously stirring the mixture for 5 to 15 min, and keeping the mixture still, standing at 0° C. for 10 to 12 h in an environment where ultraviolet light is completely shielded to obtain a third mixed liquid;
   (4) pouring the third mixed liquid into a culture dish until a height of a liquid level is 10 mm, heating the third mixed liquid to 20° C., and irradiating the third mixed liquid with the ultraviolet light having a wavelength of 100 nm to 300 nm for 3 to 5 h to obtain a fourth mixed liquid;
   (5) placing the fourth mixed liquid into a sealed container, performing alternating pulse on the solution with a magnetic field and microwaves to obtain a fifth mixed liquid; and
   (6) freezing and drying the fifth mixed liquid, washing the frozen and dried fifth mixed liquid with deionized water and acetone 7 times separately, and drying the fifth mixed liquid to obtain the two-dimensional high-entropy metal oxide assembly with high thermal conductivity.

3. The method according to claim 2, wherein in the step (4), a wavelength of the ultraviolet light is 100 nm to 300 nm.

4. The method according to claim 2, wherein in the step (5), a time interval of magnetic pulse and microwave pulse is 1 min, the magnetic field pulse lasts for 2 to 4 s, and the microwave pulse lasts for 7 to 9 s; wherein the magnetic pulse is performed 5 times in total, and the microwave pulse is performed 5 times in total; and wherein a magnetic field intensity is 0.75 to 0.85 Tesla (T), and a microwave power is 700 W to 900 W.

\* \* \* \* \*